US008689480B2

(12) United States Patent
McCafferty et al.

(10) Patent No.: US 8,689,480 B2
(45) Date of Patent: Apr. 8, 2014

(54) COLLAPSING TRAP

(75) Inventors: Jim McCafferty, San Clemente, CA (US); Greg Leong, Irvine, CA (US); Richard Ferrin, Anaheim, CA (US); Steven Douglas DeLacy, Santa Ana, CA (US)

(73) Assignee: JAKKS Pacific, Inc., Malibu, CA (US)

( * ) Notice: Subject to any disclaimer, the term of this patent is extended or adjusted under 35 U.S.C. 154(b) by 153 days.

(21) Appl. No.: 13/341,530

(22) Filed: Dec. 30, 2011

(65) Prior Publication Data

US 2013/0167427 A1 Jul. 4, 2013

(51) Int. Cl.
*A01M 23/00* (2006.01)
(52) U.S. Cl.
USPC .................................. 43/61; 43/60
(58) Field of Classification Search
USPC ........................................ 43/61, 60
See application file for complete search history.

(56) References Cited

U.S. PATENT DOCUMENTS

| 146,887 | A | * | 1/1874 | Doremus | 43/61 |
| 2,824,405 | A | * | 2/1958 | Brooks | 43/61 |
| 3,940,142 | A | | 2/1976 | Hinz et al. | |
| 5,398,442 | A | * | 3/1995 | Musket | 43/114 |
| 5,577,341 | A | * | 11/1996 | Mollo | 43/61 |
| 6,086,449 | A | | 7/2000 | Sharp | |
| 6,099,381 | A | | 8/2000 | Sodeshima | |
| 6,772,555 | B2 | * | 8/2004 | Evans et al. | 43/61 |
| 7,596,902 | B2 | * | 10/2009 | Han et al. | 43/61 |
| 7,987,628 | B2 | * | 8/2011 | Le Laidier et al. | 43/61 |

FOREIGN PATENT DOCUMENTS

| GB | 2230930 A | * | 11/1990 |
| WO | WO 9506406 A1 | * | 3/1995 |

\* cited by examiner

*Primary Examiner* — Christopher P Ellis
(74) *Attorney, Agent, or Firm* — Tope-McKay & Associates

(57) ABSTRACT

A collapsing trap is described. The collapsing trap includes a base and a plurality of surrounding panels pivotally attached with the base. An outer panel is attached with one of the surrounding panels. A locking mechanism is attached with the surrounding panels to selectively hold the panels in an open configuration. A trigger is operably connected with the locking mechanism. The locking mechanism includes a locking pivot that is attached with the base and connected with the trigger. The locking pivot is adapted to rotate and lock onto each of the surrounding panels to hold the surrounding panels in an open and substantially planar configuration. When the locking pivot is activated by the trigger, the locking pivot rotates to release the surrounding panels and cause the surrounding panels (and outer panel) to collapse up and around the base to trap the item therein.

7 Claims, 3 Drawing Sheets

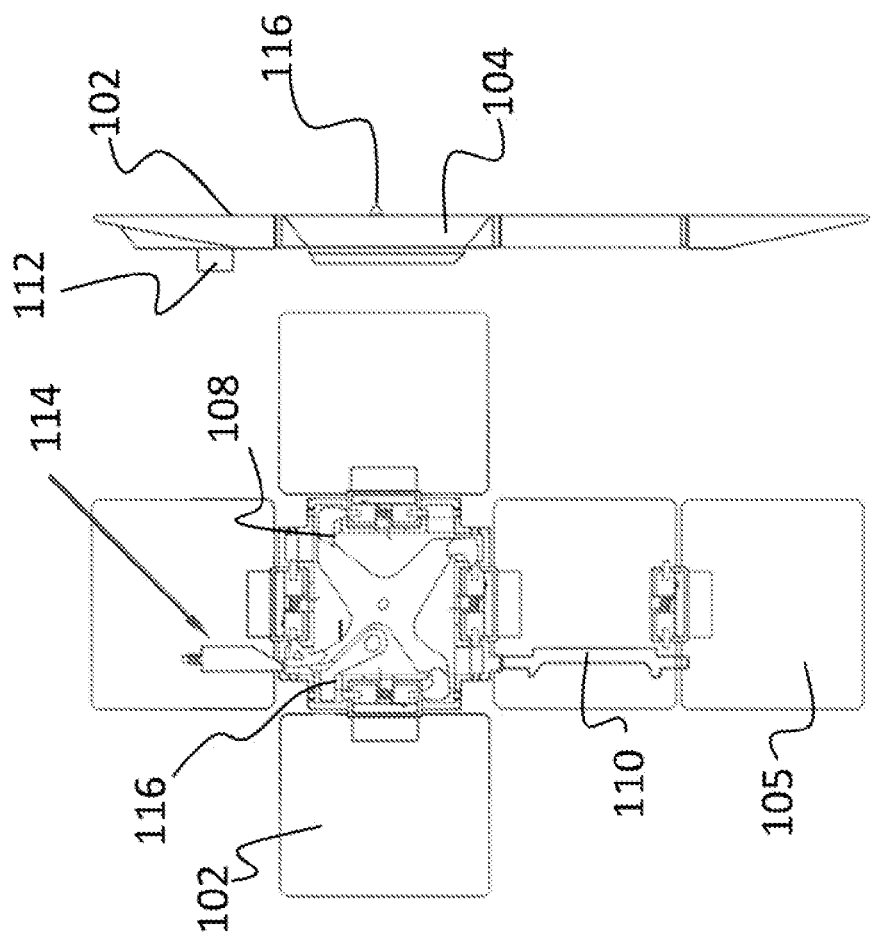
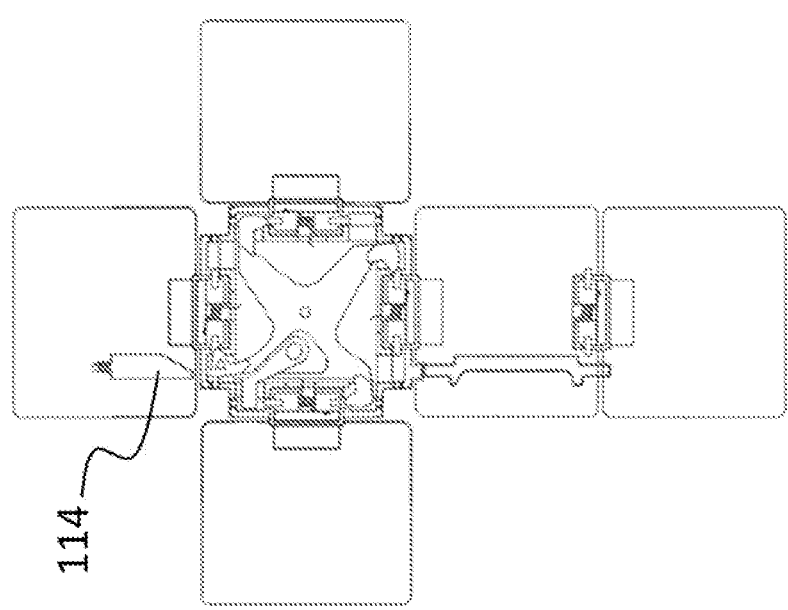
FIG. 3A  FIG. 3B  FIG. 3C

COLLAPSING TRAP

BACKGROUND OF THE INVENTION (1) Field of Invention

The present invention relates to a toy trap and, more particularly, to a trap that is configured to collapse up and around a passing item.

(2) Description of Related Art

Traps have long been known in the art to catch a variety of items. For example, animal traps are often employed to capture animals. Such animal traps typically utilize a cage or other enclosure that becomes sealed or otherwise inescapable once entered by an animal.

While one can imagine that such cage-based traps can be applied to toys, nothing heretofore devised has provided a trap that is substantially planar and that, upon actuation, collapses up and around the item to be trapped.

Thus, a continuing need exists for a toy trap that collapse up and around an item to be trapped.

SUMMARY OF INVENTION

The present invention is directed to a collapsing trap. The collapsing trap includes a base and a plurality of surrounding panels pivotally attached with the base. An outer panel is attached with one of the surrounding panels. A locking mechanism is attached with the surrounding panels to selectively hold the panels in an open configuration. A trigger is operably connected with the locking mechanism. The locking mechanism includes a locking pivot that is attached with the base and connected with the trigger. The locking pivot is adapted to rotate and lock onto each of the surrounding panels to hold the surrounding panels in an open and substantially planar configuration. The locking mechanism further includes a locking arm that is selectively attached with and between a surrounding panel and the outer panel, such that the locking arm is adapted to engage with the outer panel when the corresponding surrounding panel is locked into an open position. When said surrounding panel is released through actuation of the trigger, the locking arm is drawn from the outer panel, thereby causing the outer panel to flip up and toward the base. Further, when the locking pivot is activated by the trigger, the locking pivot rotates to release the surrounding panels and cause the surrounding panels (and outer panel) to collapse up and around the base to trap the item therein.

In another aspect, each of the surrounding panels and outer panel are square shaped such that when the surrounding panels and outer panel are collapsed up and around the base to form a closed trap, the closed trap is cube-shaped.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 3A is a bottom-view illustration, depicting the process by which the trap is set;

FIG. 3B is a bottom-view illustration, depicting the process by which the trap is set; and FIG. 3C is a left, side-view illustration, depicting the trap in a set position.

DETAILED DESCRIPTION

The present invention relates to a toy trap and, more particularly, to a trap that is configured to collapse up and around a passing item. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

Figure 1:
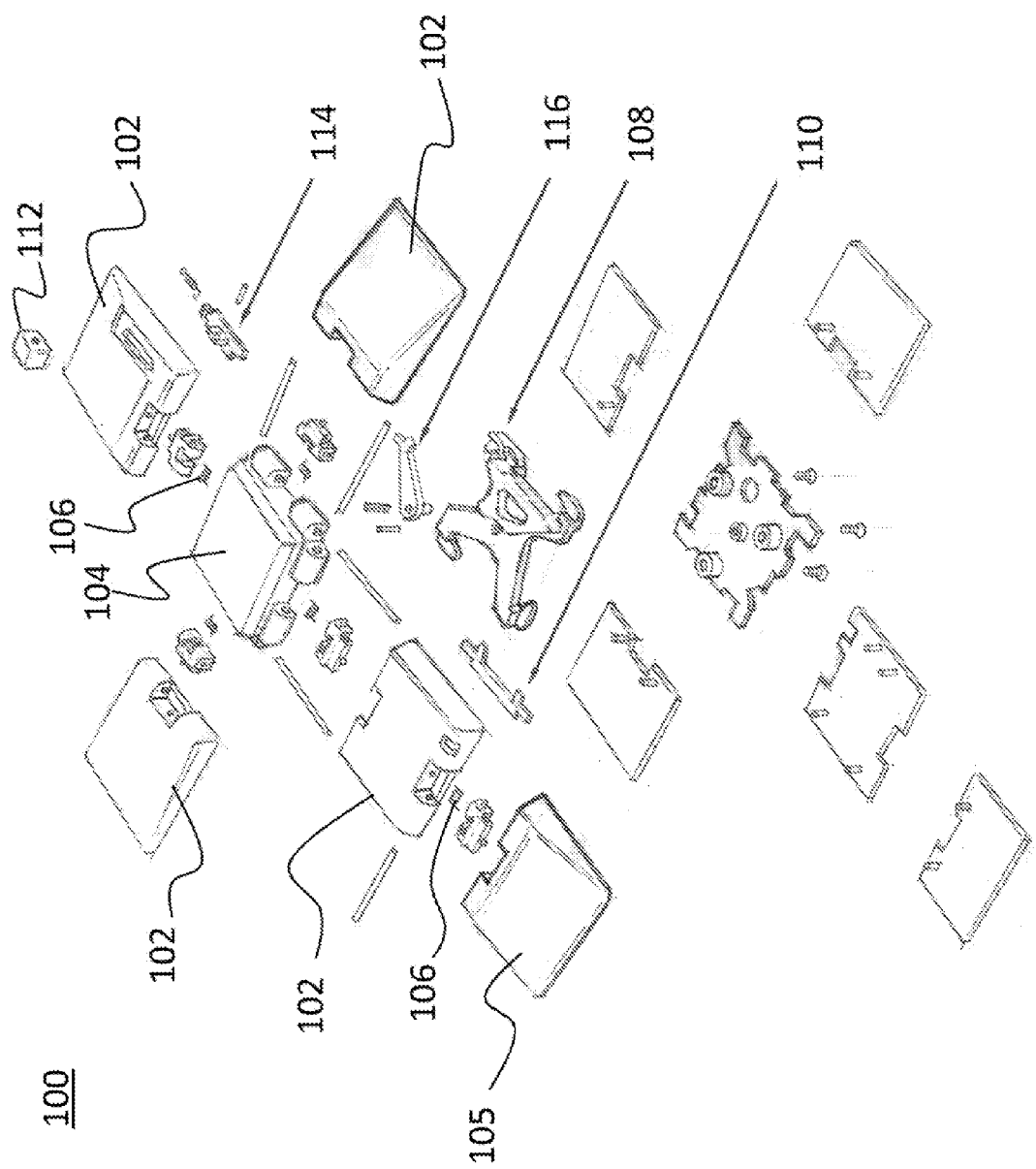
FIG. 1 is an exploded-view illustration of a collapsing trap according to the present invention, depicting various components of the trap.

The present invention relates to a toy trap and, more particularly, to a trap that is configured to collapse up and around a passing item. As shown in FIG. 1, the trap 100 includes several components that enable the trap to collapse up an around an item. Importantly, the trap 100 includes a plurality of panels that are pivotally connected to a base 104. The panels include surrounding panels 102 and an outer panel 105. The panels 102 and 105, in conjunction with the base 104 collectively form the walls of the trap 100. Using a bias means 106, the panels 102 and 105 are biased to pivot and collapse up and around the base 104. For example, the panels 102 and 105 are spring loaded to cause the panels 102 and 105 to collapse up and around the base 104.

When the panels 102 and 105 are separated from the base 104, a locking mechanism is employed to hold the trap in an open position. The locking mechanism is any suitable mechanism or device that allows the panels 102 and/or 105 to collapse up and around an item. As a non-limiting example, the locking mechanism includes a locking pivot 108 that selectively locks with the surrounding panels 102. In other words, the locking pivot 108 is pivotally connected with the base 104 (e.g., on its underside) and can be rotated to engage with each of the surrounding panels 102. The locking pivot 108 can includes a series of projections, each of which can engage with and lock (e.g., through corresponding indentations that receive the projections) a surrounding panel 102, thereby locking the surrounding panels 102 in an open and substantially planar position.

A locking arm 110 (or similar device) can also be included to lock the outer panel 105. For example, the locking arm 110 is selectively attached with and between a surrounding panel 102 and the outer panel 105. In this example, the locking arm 110 is extended to engage with the outer panel 105 when the corresponding surrounding panel 102 is locked (by the locking pivot 108) into an open and planar position. However, when said surrounding panel 102 is released from the locking pivot 108, the locking arm 110 is drawn from the outer panel 105, thereby causing the outer panel 105 to flip up and toward the base 104 (due to the bias means 106).

A switch 112 can be used to lock the trap 100 into the open position. For example, a switch 112 is attached with a switch lever 114 that can be operated to selectively engage with the locking pivot 108. For example, a user can cause the switch lever 114 to engage with the locking pivot 108 and hold the panels 102 and 105 in an open and substantially planar position.

Finally, a trigger 116 is included for actuating the trap 100. The trigger 116 is any suitable mechanism or device that is operable for causing the panels 102 and/or 105 to collapse up and around an item. As a non-limiting example, the trigger 116 protrudes from a bottom of the trap 100. By protruding the trigger 116 from a bottom of the trap 100, any weight placed on the base 104 will activate the trap 100. Further, the trigger 116 is operably connected with the locking pivot 108 such that upon actuation of the trigger 116, the locking pivot 108 is rotated to release each of the surrounding panels 102, thereby causing the surrounding panels to collapse up. In doing so, the appropriate surrounding panel 102 also causes the locking arm 110 to be drawn from the outer panel 105, thereby causing the outer panel 105 to flip up and toward the base 104.

Figure 2:
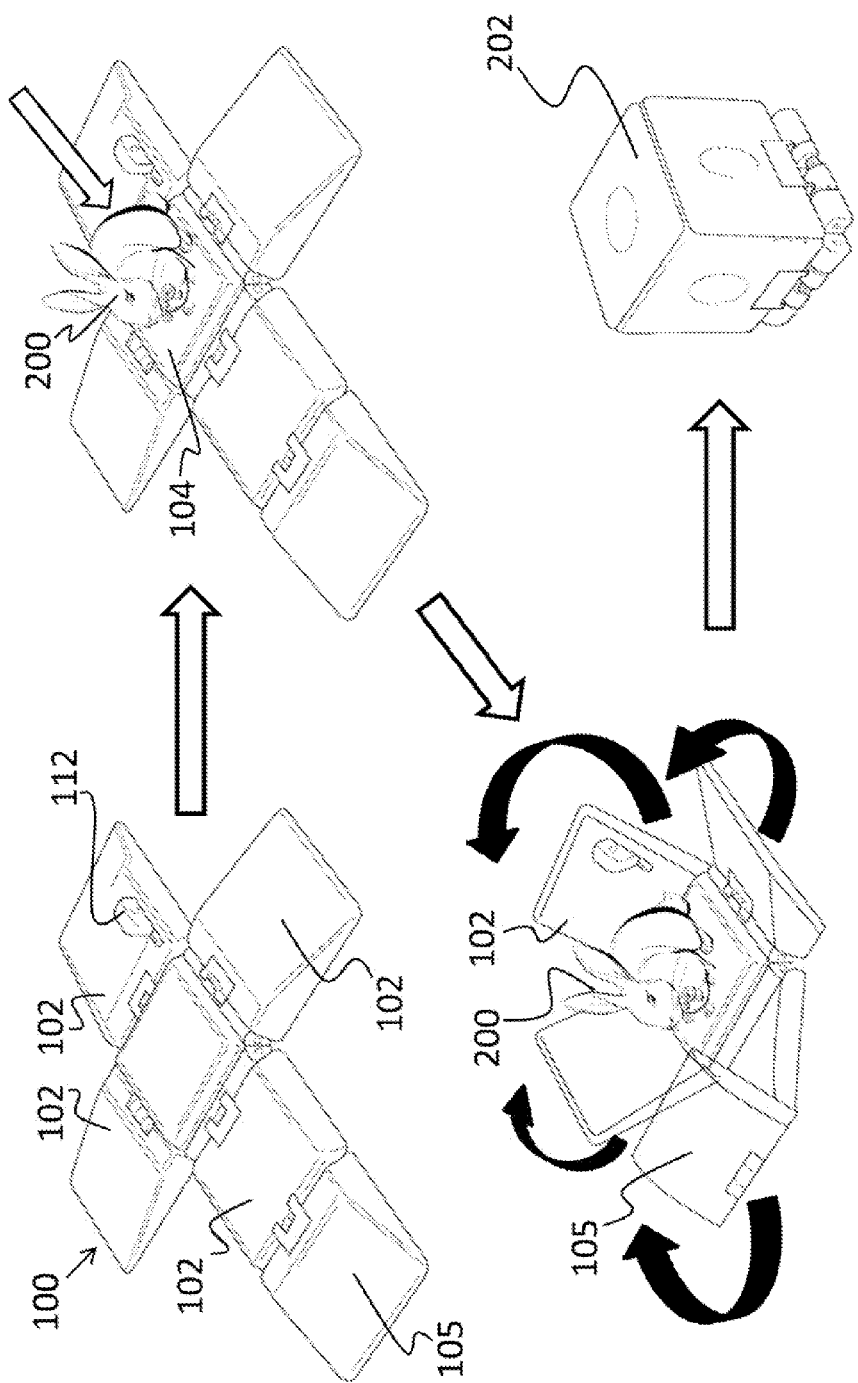
FIG. 2 is a step-wise illustration, depicting the process by which the trap collapses around an item.

For further understanding, FIG. 2 depicts the trap 100 in operation. As shown, the trap 100 can be locked into an open position by flattening the panels 102 and 105 and setting the switch 112 to a lock position. When an item 200 (such as a toy or animal) enters the trap 100 and is positioned upon the base 104, the trigger (not shown in FIG. 2) is activated (due to the weight of the item 200 on the base). As shown, the panels 102 and 105 then collapse up and around the item 200 to form a closed trap 200 and trap the item therein. Although each of the panels 102 and 105 are depicted as squares with the resulting closed trap 200 being depicted as a cube, the invention is not intended to be limited thereto as there are other configurations that can be envisioned with the present invention. For example, triangular surrounding panels can be employed in a trap that includes no outer panels and forms a pyramid-shaped closed trap.

The locking mechanism is further illustrated in FIGS. 3A through 3C. As shown in the bottom-view illustration of FIGS. 3A and 3B, the switch lever 114 can be moved forward to cause the locking pivot 108 to rotate and lock (hook) onto each of the surrounding panels 102. Further, by flattening the surrounding panels 102, the trigger 116 is lowered and the locking arm 110 is extended to hold the outer panel 105 in the open configuration. The left, side-view illustration of FIG. 3C depicts the trigger 116 as lowered below the base 104, while the switch 112 protrudes above one of the surrounding panels 102.

As can be appreciated, numerous variations and modifications can be made without departing from the spirit of the present invention. Therefore, it should be clearly understood that the forms of the present invention described above and shown in the figures of the accompanying drawings are illustrative only and are not intended to limit the scope of the present invention.

What is claimed is:

1. A collapsing trap, comprising:
   a base,
   a plurality of surrounding panels pivotally attached with the base:
   a locking mechanism attached with the surrounding panels and adapted to selectively hold the surrounding panels in an open configuration;
   a trigger operably connected with the locking mechanism such that upon actuation of the trigger by an item, the surrounding panels collapse up and around the base to form a closed trap and to trap the item therein:
   wherein the surrounding panels are biased to close up and around the base: and
   wherein the locking mechanism includes a locking pivot attached with the base and operably connected with the trigger, the locking pivot being adapted to rotate and lock onto each of the surrounding panels to hold the surrounding panels in an open and substantially planar configuration, wherein upon actuation of the trigger, the locking pivot rotates to release the surrounding panels and cause the surrounding panels collapse up and around the base to trap the item therein.

2. The collapsing trap of claim 1, further comprising an outer panel pivotally connected with one of the surrounding panels.

3. The collapsing trap of claim 2, wherein the locking mechanism further includes a locking arm that is selectively attached with and between a surrounding panel and the outer panel, such that the locking arm is adapted to engage with the outer panel when the corresponding surrounding panel is locked into an open position, when said surrounding panel is released, the locking arm is drawn from the outer panel, thereby causing the outer panel to flip up and toward the base.

4. The collapsing trap of claim 3, wherein each of the surrounding panels and outer panel are square shaped such that When the surrounding panels and outer panel are collapsed up and around the base to form a closed trap, the closed trap is cube-shaped.

5. A collapsing trap, comprising:
   a base;
   a plurality of surrounding panels pivotally attached with the base,
   a locking mechanism attached with the surrounding panels and adapted to selectively hold the surrounding panels in an open configuration
   a trigger operably connected with the locking mechanism, such that upon actuation of the trigger by an item, the surrounding panels collapse up and around the base to form a closed trap and to trap the item therein: and
   an outer panel pivotally connected with one of the surrounding panels.

6. The collapsing trap of claim 5, wherein each of the surrounding panels and outer panel are square shaped such that when the surrounding panels and outer panel are collapsed up and around the base to form a closed trap, the closed trap is cube-shaped.

7. A collapsing trap, comprising;
a base;
a plurality of surrounding panels pivotally attached with the base;
a locking mechanism attached with the surrounding panels and adapted to selectively hold the surrounding panels in an open configuration;
a trigger operably connected with the locking mechanism, such that upon actuation of the trigger by an item, the surrounding panels collapse up and around the base to form a closed tray and to trap the item therein; and
wherein each of the surrounding panels are square shaped.

\* \* \* \* \*